Feb. 17, 1953     C. ANSCHUTZ     2,628,727
BARGE UNLOADING DEVICE
Filed May 10, 1948
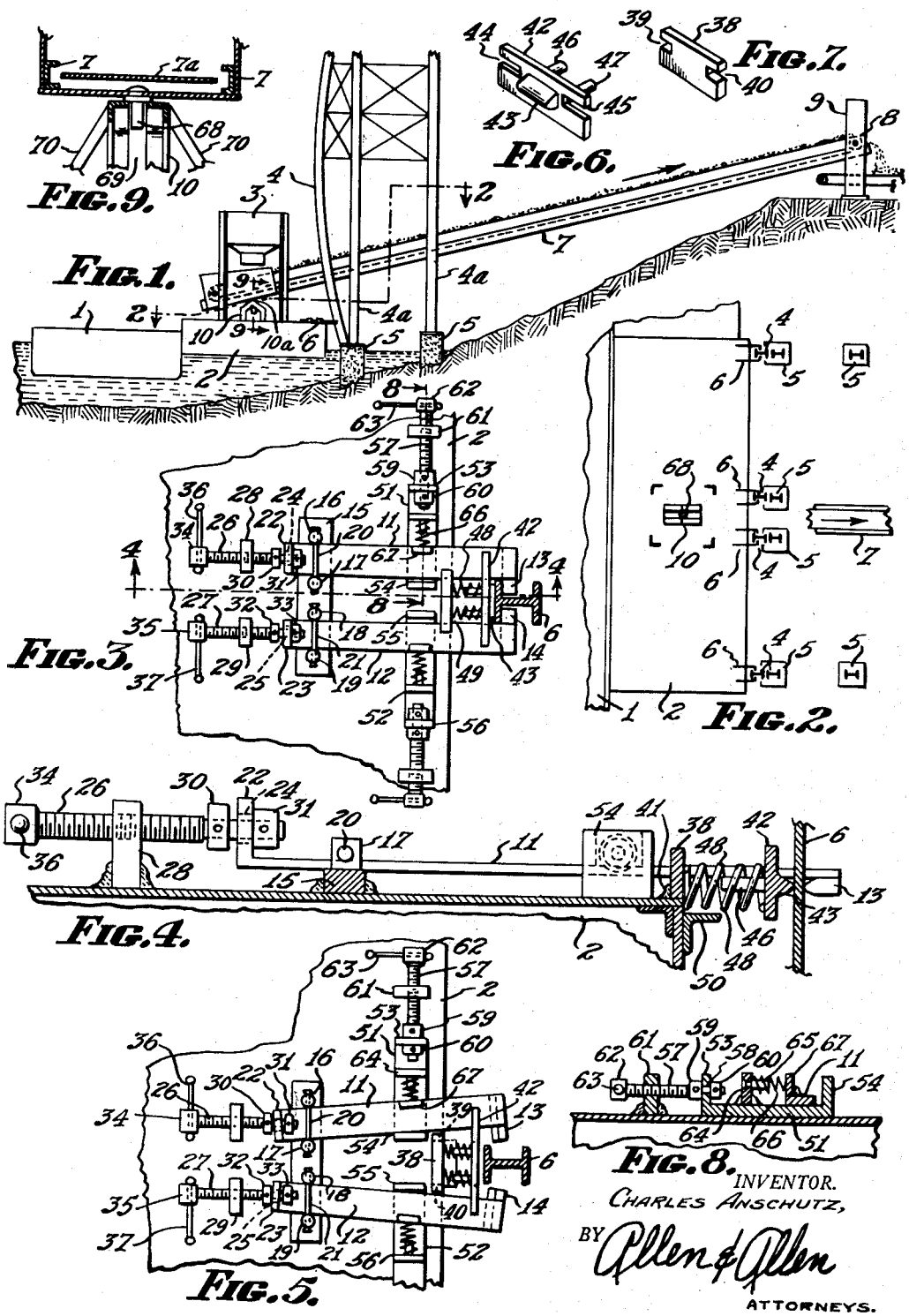
INVENTOR.
CHARLES ANSCHUTZ,
BY Allen & Allen
ATTORNEYS.

Patented Feb. 17, 1953

2,628,727

UNITED STATES PATENT OFFICE 2,628,727

BARGE UNLOADING DEVICE

Charles Anschutz, Dayton, Ky.

Application May 10, 1948, Serial No. 26,197

9 Claims. (Cl. 214—14)

My invention has to do with equipment for unloading and conveying coal or other materials from river barges to reloading or storage facilities located on shore.

In the art of unloading coal barges as it is currently practiced, the loaded barges are secured to an unloading barge anchored at the unloading station. The unloading barge is a permanent part of the unloading equipment and carries on its deck a large bin or hopper into which the coal from the loaded barges is deposited, a crane and bucket arrangement being used to scoop up the coal and deposit it in the hopper. From the hopper the coal is deposited onto a belt conveyor which carries it from the unloading barge to the shore, where a continuation of the conveyor belt carries it either to a storage pile or to waiting coal cars, trucks or the like. The conveyor belt extending from the shore to the unloading barge is carried by a conveyor boom supported from its shore end, with the free end of the boom extending onto the unloading barge and in position to receive the coal as it is released from the hopper.

During unloading operations using equipment of this character, it is necessary with each change in the level of the body of water in which the barges are floating, to adjust the mooring lines securing the unloading barge to the shore, as well as adjust the position of the conveyor boom relative to the unloading barge. Unless these adjustments are made, the unloading barge and the conveyor boom will not be maintained in proper operating position relative to each other. For example, suppose the unloading barge is securely anchored to the shore and the conveyor boom correctly positioned so that its end will extend onto the barge and lie beneath the hopper, and then suppose that the level of the body of water recedes. The unloading barge will be lowered by the distance the water level recedes and the mooring lines securing the barge to the shore must be adjusted accordingly to accommodate the barge in its new position. With the barge in a lower position, the conveyor unloading boom must be lowered accordingly in order to maintain the end of the boom below the hopper. In areas where the water level is subject to relatively rapid changes, repeated adjustments of the unloading barge mooring lines and the position of the conveyor boom are necessary; and this involves repeated interruptions to the unloading operations and is both costly and inconvenient. It is to the elimination of these difficulties which are inherent in unloading operations of this character that the present invention is directed.

While I shall describe my invention as it will apply to the unloading of coal from river barges, it should be understood that my invention is equally applicable to the loading or unloading of divers materials not only from barges but from other classes of vessels, such as those of the lake and ocean-going varieties.

It is a principal object of my invention to eliminate the difficulties inherent in maintaining proper operating relationship between conveyor mechanism fixed on land and extending to a floating body, and the floating body itself, by providing a conveyor boom pivoted on its shore end and supported by the floating body on its free end, whereby the free end of the boom will be moved by the floating body. Combined with this objective, it is a further object of my invention to provide means for guiding the floating body as it moves with the rise and fall of the water level, said means guiding the floating body in a path such that the point at which the boom contacts the floating body will move in an arcuate path with respect to the pivot point of the boom so that the end of the boom will remain fixed relative to the floating body and hence in proper operating relationship therewith.

It is a further object of my invention to provide clamping means whereby the floating body may be connected to the guiding means for slidable movement thereon.

Yet another object of my invention is the provision of means on the floating body to accept and position the end of a conveyor boom in a fixed position relative to said floating body.

To the attainment of these objectives as well as others which will appear hereinafter or will be apparent to one skilled in the art upon reading these specifications, I accomplish by that construction and arrangement of parts of which I shall now describe an exemplary embodiment. Reference is made to the accompanying drawings forming part of this specification, and in which:

Fig. 1 is an elevational view illustrating the general layout of an unloading device according to my invention.

Fig. 2 is a plan view taken along the irregular line 2—2 of Fig. 1 and illustrates in diagrammatic fashion the relative positions of the unloading barge, the conveyor boom, and the fixed supports of the guiding means to which the hopper barge is moored.

Fig. 3 is a plan view of one of the clamping devices in closed position about one of the guiding means.

Fig. 4 is an elevational view taken along the line 4—4 of Fig. 3.

Fig. 5 is a partial elevational view showing the clamping device in open position.

Fig. 6 is a perspective view showing one of the parts of the clamping device.

Fig. 7 is also a perspective view and illustrates another part of the clamping device.

Fig. 8 is an elevational view taken along the line 8—8 of Fig. 3, and shows details of the screws for the clamping arms.

Fig. 9 is a sectional view taken along the line 9—9 of Fig. 1, and illustrates details of the boom rest.

For an understanding of the general operation of my invention, reference is made to Figs. 1 and 2 of the drawing, wherein reference numeral 1 indicates a loaded coal barge secured to the unloading barge 2. A coal hopper 3 on the deck of the unloading barge receives the coal, removed from the coal barge. The unloading barge is connected to the guide bars 4 supported on the pilings 5 by means of the clamping devices 6. A conveyor boom 7 carrying a belt conveyor 7a extends from the shore to the unloading barge, being pivoted at 8 to the fixed support 9. The free end of the conveyor boom extends beneath the hopper 3 and is supported on the unloading barge by the boom rest 10.

The conveyor boom 7 is movable about its pivot point 8, and in so moving the free end of the boom travels in an arcuate path, the path being that of an arc of a circle having the pivot point 8 as its center. In order for the boom to be moved by the unloading barge as the barge changes elevation with the rise and fall of the water level, with a given point on the boom in contact with a fixed point on the unloading barge (the boom 7 contacting the end of the boom rest 10 at the point 10a), it is necessary for the end of the boom rest to move in an arcuate path corresponding to the path of the boom. Since the boom rest is fixed to the unloading barge and moves with it, the barge must be guided as its elevation is changed by changes in the water level so that it will move the point 10a of the boom rest in the proper arcuate path.

The unloading barge is guided in the proper path by the guide bars 4 to which it is slidably attached. The guide bars are curved throughout their lengths and extend upwardly from the pilings 5, being supported by the superstructure 4a. As seen in Fig. 2, a plurality of the guide bars are spaced along the length of the unloading barge, their number varying with the length of the unloading barge. The curvature of the guide bars 4 is determined by the length of the conveyor boom, the guide bars being formed as the arcs of circles having the distance between the pivot point 8 and the contact point 10a as their radius. In other words, the guide bars are congruent with the arcuate path described by the contact point 10a. The guide bars are not, however, concentric with the pivot point 8, but rather have their centers displaced from the pivot point 8 by the distances and at the angles the clamping devices are displaced from the contact point 10a. Stating it differently, the centers of the guide bars are displaced from the pivot point 8 by the distance and at the angles the points of contact of the barge with the guide bars are displaced from the point at which the boom contacts the barge. With this arrangement, no matter at what elevation the unloading barge contacts the guide bars, the distance of the point 10a from the pivot point 8 will be constant. Consequently the conveyor boom, which is of fixed length, will always contact the boom rest 10 at the point 10a, regardless of the elevation of the unloading barge.

The guide bars 4, in addition to being arcuate in length, are angular in cross-section, being preferable of I or T shapes so that they may be readily engaged by the clamping devices which attach the unloading barge to them. While in the drawing I have shown the guiding bars as being "I" shaped in cross-section, it should be understood that other shapes may be employed without departing from the spirit of my invention.

The function of the clamping devices 6 is to attach the unloading barge to the guiding bar for sliding engagement therewith, whereby the unloading barge will be securely anchored to the guiding bars and yet free to move along the guiding bars as the elevation of the barge is changed. In Fig. 3 I have illustrated a device suitable for this purpose comprising a pair of clamping arms 11 and 12 having inwardly extending projections 13 and 14 which engage about the angular end of the guide bar 4. The opposite ends of the clamping arms rest on a fixed support 15, being positioned between spaced pairs of guide pins 16, 17 and 18, 19 extending upwardly from the support 15. The rods 20 and 21 extend between the pairs of guide pins 16, 17 and 18, 19, passing over the clamping arms 11 and 12. The ends of the clamping arms extending between the pins terminate in upturned flanges 22 and 23 having openings 24 and 25 therein through which pass the ends of the screws 26 and 27 held intermediate their ends by the threaded lugs 28 and 29 welded or otherwise held in fixed position. The collars 30, 31 and 32, 33 carried on the ends of the screws lie on opposite sides of the upturned flanges 22 and 23 and join the screws with the flanges. The openings 24 and 25 in the flanges are larger than the ends of the screws and the collars are spaced from each other a distance greater than the thickness of the flanges so as to permit some pivoting movement of the clamping arms about the pins 16, 17 and 18, 19. The opposite ends of the screws 26 and 27 are provided with screw heads 34 and 35 and lever arms 36 and 37 are slidable therethrough so that the screws may be turned in their lugs. By turning the screws, the clamping arms may be tightened or loosened, as will be apparent from the drawings.

Cooperating with the clamping arms 11 and 12 is a movable plate 42 held between the clamping arms and movable along the arms. The movable plate 42 is shown in detail in Fig. 6, and comprises a substantially rectangular plate of a size sufficient to extend between the clamping arms even when they are in the extended or outwardly pivoted position, as shown in Fig. 5. The plate has horizontally disposed slots 44 and 45 to for engagement with the clamping arms, and one face of the plate is provided with a rounded projection 43 and the other face with a pair of spaced studs 46 and 47. The plate is fitted on the clamping arms with the rounded projection 43 outermost. Coil springs 48 and 49 pass around the studs 46 and 47 and are pressed between the plate 42 and a lug 38 fixed between the clamping arms 11 and 12 substantially as shown in Figs. 3 and 4 of the drawings. The lug 38, as seen in Fig. 7, is rectangular in shape and has horizontally extending slots 39 and 40 for the reception of the clamping arms 11 and 12. The lug 38 in addition to providing a support for the springs 48 and 49, also serves to maintain the clamping arms in proper horizontal alignment. An abutment 50 placed as shown in Fig. 4 may be provided to maintain the ends of the springs in contact with the lug 38. The springs 48 and 49 urge the movable plate 42 toward the projections 13 and 14 and will clamp the angular edge of the guiding bar between the plate 42 and the projections 13 and 14. The clamping pressure is increased or decreased by moving the clamping arms, the screws 26 and 27 being turned for this purpose. The edges of the projections 13 and 14 are rounded, as is the edge of the projection 43, and while the clamping action of the projections is sufficient to hold the barge to the guiding bar, it is not so great as to prevent the rounded edges from sliding along the guide bar as the barge is moved vertically by changes in the water level. It is, however, not without the spirit of my invention to provide the clamping arms and movable plate with roller means to facilitate movement along the guiding bar.

The clamping arms are opened for engagement about the guiding bar and closed about the bar by means of screw and spring elements engaging the arms intermediate their ends. Referring to Figs. 5 and 8, the arms are supported intermediate the lug 38 and the pins 16, 17 and 18, 19 by the sliding bars 51 and 52 having upturned flanges 53, 54 and 55, 56. Referring to the bar 51, the flange 53 is connected to an end of screw 57 passing through opening 58 by the collars 59 and 60. In this instance, the opening 58 is not oversize and the collars 59 and 60 are in direct contact with the sides of the flange 53. A fixed, threaded lug 61, screw head 62 and lever arm 63 are provided in the manner illustrated. As best seen in Fig. 8, the sliding bar 51 has a lug 64 carrying stud 65 fixed thereon, with a compression spring 66 fitted about the stud 65 and between the lug 64 and an abutment 67 fixed to the clamping arm 11. The spring 66 thus normally urges the clamping arm 11 into contact with the flange 54. The sliding bar 52 for the arm 12 is provided with screw and spring elements of identical character, and these need no further description.

In Fig. 5 the clamping arms are shown in open position, the arms having been drawn apart by the sliding bars 51 and 52 which move away from each other, being drawn by their respective screw elements. To close the arms, the sliding bars are moved toward each other to assume the position shown in Fig. 3.

The clamping devices can be fixed directly to the deck of the vessel or they may be made as detachable units for attachment to the particular vessel being unloaded. The clamping arms are held against possible vertical movement relative to the vessel by means of the rods 20 and 21 and the lug 38. The springs on the sliding bars 51 and 52 together with the springs 48 and 49 acting on the plate 42, serve to prevent horizontal twisting and sliding movement of the vessel relative to the guide bars and also impart resiliency to the device to relieve excessive strain on the parts and absorb shock.

Reference is now made to Fig. 9 of the drawings wherein the boom rest 10 is shown in detail, together with the conveyor boom 7 supported thereon. The conveyor boom has a downwardly projecting tongue 68, which is received by a slot 69 in the boom rest, the slot extending in the direction of the length of the boom. The tongue and elongated slot will prevent side-wise movement of the conveyor boom and yet will permit pivoting movement of the boom as it travels with the unloading barge, as well as allow for some movement of the parts should the barge be moved slightly, as by a sudden impact.

While I have described my invention as it applies to the unloading of material onto an unloading barge from whence the material is conveyed to shore, it will be evident that the principles of my invention will be equally applicable to numerous other loading and unloading operations. For example, the unloading barge could be simply a float, or it could be eliminated entirely and the vessel to be loaded or unloaded connected directly to the guiding bars with the conveyor boom extending directly onto the vessel. Numerous modifications apparent to one skilled in the art may be made without departing from the spirit of the invention, and I do not intend to be limited in any manner other than as expressed in the claims which follow.

Having thus described my invention, what I desire to secure by Letters Patent is:

1. In a barge unloading device, a support positioned on shore, a rigid member pivotally connected to said support at one end and adapted to be supported at its other end by a floating barge, and a stationary, upstanding guide member positioned to be contacted by said barge to guide the barge in a predetermined path as its elevation is changed whereby the rigid member will be maintained in fixed operative relationship with respect to said barge.

2. In a barge unloading device, a support positioned on shore, a rigid member pivotally connected to said support at one end and adapted to be supported at its other end by a floating barge, and a stationary, upstanding arcuate member positioned to be contacted by said barge to guide said barge in a predetermined path relative to the pivot point of said rigid member as the elevation of said barge is changed, whereby the rigid member will be maintained in fixed operative relationship with respect to said barge.

3. In a barge unloading device, a support positioned on shore, a rigid member pivotally connected to said support at one end and adapted to be supported at its other end by a floating barge, a stationary, upstanding guide member positioned to be contacted by said barge to guide said barge in a predetermined path relative to the pivot point of said rigid member as the elevation of said barge is changed, and means for connecting said barge to said guide member for movement therealong.

4. In a barge unloading device, a support positioned on shore, a rigid member pivotally connected to said support at one end and adapted to be supported at its other end by a floating barge, a stationary, upstanding guide member positioned to be contacted by said barge to guide said barge in a predetermined path relative to the pivot point of said rigid member as the elevation of said barge is changed, means for connecting said barge to said guide member for movement therealong, and supporting means on said barge for receiving and positioning the end of the rigid member.

5. In a barge unloading device, a support positioned on shore, a rigid member pivotally connected to said support at one end and adapted to be supported at its other end by a floating barge, a stationary, upstanding guide member positioned to be contacted by said barge to guide said barge in a predetermined path relative to the pivot point of said rigid member as the elevation of said barge is changed, means for connecting said barge to said guide member for movement therealong, supporting means on said barge for receiving and positioning the end of the rigid member, and a hopper fixed on said barge in a position substantially above the juncture of said rigid member and said supporting means, and conveyor means associated with said rigid member.

6. In a barge unloading device, a support positioned on shore, a rigid member fixed to said support at one end and adapted to be pivotally supported on a floating barge at its other end, a hopper fixed on said barge in a position substantially above the juncture of said rigid member and said barge, conveyor means associated with said rigid member, and a stationary, upstanding arcuate guide member adapted to be connected by an edge of said barge whereby the receiving end of said conveyor means and said hopper are maintained in substantially constant relationship as the elevation of the barge is changed.

7. In a barge unloading device, a support positioned on shore, a rigid member pivotally connected to said support at one end and adapted to be supported at its other end by a floating barge, a stationary, upstanding arcuate guide member positioned to be contacted by said barge to guide said barge in a predetermined path relative to the pivot point of said rigid member as the elevation of said barge is changed, and attachment means for connecting said barge to said arcuate guide member, said means comprising a pair of arms having projections for engaging about opposite side edges of said arcuate member, a member movable on said arms intermediate their ends, and a spring member urging said movable member toward said projections, whereby said movable member and said projections will clamp the arcuate guide member between them, said attachment means being rigidly affixed to said barge at its point of contact with said arcuate guide member.

8. In a device for loading and unloading barges, a boom having one end pivoted to a support on shore at a point A and having its other end supported on a floating barge at a point B, stationary guide means intermediate the points A and B for contact by the side edge of the barge nearest the shore, the said barge contacting the said guide means at a point C, the said guide means comprising an upstanding arcuate guide member formed as the arc of a circle having a radius equal to the distance between the points A and B and having its center located at a point D, the said point D being so located that a straight line drawn between the points A and D will be equal in length and parallel to a straight line drawn between the points B and C.

9. The device claimed in claim 8 in which there are a plurality of said guide members spaced apart for contact by the side edge of said barge nearest the shore.

CHARLES ANSCHUTZ.

REFERENCES CITED

The following references are of record in the file of this patent:

UNITED STATES PATENTS

| Number | Name | Date |
|---|---|---|
| 710,194 | Hughes | Sept. 30, 1902 |
| 742,436 | Hulett | Oct. 27, 1903 |
| 747,413 | Gholson | Dec. 22, 1903 |
| 985,371 | Roeth | Feb. 28, 1911 |
| 1,094,610 | Steinhauer | Apr. 28, 1914 |
| 1,504,960 | Llewellyn | Aug. 12, 1924 |
| 1,508,320 | Heide | Sept. 9, 1924 |
| 1,673,813 | Edelmann | June 19, 1928 |
| 2,060,925 | Brosh | Nov. 17, 1936 |